(12) United States Patent
Schmitt et al.

(10) Patent No.: US 7,706,634 B2
(45) Date of Patent: Apr. 27, 2010

(54) METHOD AND CAMERA (APPARATUS) FOR OPTICALLY CAPTURING A SCREEN

(75) Inventors: Peter Schmitt, Erlangen (DE); Dieter Schmidt, Nuremberg (DE); Guenther Kostka, Erlangen (DE); Rolf Behrendt, Dormitz (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1207 days.

(21) Appl. No.: 11/185,658

(22) Filed: Jul. 19, 2005

(65) Prior Publication Data

US 2006/0023078 A1    Feb. 2, 2006

Related U.S. Application Data

(63) Continuation of application No. PCT/EP03/14817, filed on Dec. 23, 2003.

(30) Foreign Application Priority Data

Jan. 20, 2003    (DE)    ................................ 103 01 941

(51) Int. Cl.
     *G06K 9/36*      (2006.01)
     *G06K 9/40*      (2006.01)
     *G06K 9/32*      (2006.01)
     *H04N 5/228*      (2006.01)
     *H04N 5/225*      (2006.01)
     *H04N 9/04*      (2006.01)

(52) U.S. Cl. ........................ 382/294; 382/293; 382/284; 382/286; 382/276; 382/275; 348/222.1; 348/207.99

(58) Field of Classification Search ................. 382/294, 382/293, 287, 276, 284, 286, 275; 348/222.1, 348/207.99, 571–721

See application file for complete search history.

(56) References Cited

U.S. PATENT DOCUMENTS 3,833,762 A * 9/1974 Gudmundsen ......... 348/208.99

(Continued)

FOREIGN PATENT DOCUMENTS

DE      19637478      3/1997

(Continued)

*Primary Examiner*—Andrew W Johns
*Assistant Examiner*—Mia M Thomas
(74) *Attorney, Agent, or Firm*—Michael A. Glenn; Glenn Patent Group (57) ABSTRACT

A camera for optically capturing a screen, wherein the screen has an area and wherein a predetermined overall resolution is provided for the optical capture, comprises a camera support with an array of camera mounts, an array of optical individual cameras as well as an image processing device for processing digital individual images of the array of optical individual cameras to generate the optical capture of the screen with the predetermined overall resolution. The image processing device is effective to reduce a correction of the individual images with regard to alignment inaccuracies and/or parameter variations, wherein for correction purposes a correction resolution is used, which is higher than the overall resolution, and wherein for every individual camera an individual correction rule is used for the correction. After the correction has been performed, the corrected overall image is brought to the predetermined overall resolution by combining adjacent pixels. Thereby, with inexpensive individual cameras, an image of a large-format screen is obtained efficiently, inexpensively and with little artifacts.

22 Claims, 5 Drawing Sheets

U.S. PATENT DOCUMENTS

| | | | | |
|---|---|---|---|---|
| 5,465,284 | A * | 11/1995 | Karellas | 378/62 |
| 5,617,461 | A * | 4/1997 | Schreiner | 378/98.5 |
| 5,752,446 | A * | 5/1998 | Squibb | 101/486 |
| 5,828,793 | A * | 10/1998 | Mann | 382/284 |
| 5,970,115 | A * | 10/1999 | Colbeth et al. | 378/62 |
| 6,002,433 | A * | 12/1999 | Watanabe et al. | 348/246 |
| 6,002,743 | A * | 12/1999 | Telymonde | 378/98.8 |
| 6,038,349 | A * | 3/2000 | Cullen | 382/294 |
| 6,041,132 | A * | 3/2000 | Isaacs et al. | 382/100 |
| 6,163,339 | A * | 12/2000 | Meunier | 348/218.1 |
| 6,185,043 | B1 * | 2/2001 | Imamura | 359/619 |
| 6,403,962 | B1 * | 6/2002 | Schmitt et al. | 250/368 |
| 6,418,245 | B1 * | 7/2002 | Udagawa | 382/312 |
| 6,459,821 | B1 * | 10/2002 | Cullen | 382/294 |
| 6,497,511 | B1 * | 12/2002 | Schmitt et al. | 378/207 |
| 6,611,241 | B1 * | 8/2003 | Firester et al. | 345/1.3 |
| 6,650,791 | B1 * | 11/2003 | Cullen | 382/294 |
| 6,870,563 | B1 * | 3/2005 | Kang | 348/222.1 |
| 6,870,564 | B1 * | 3/2005 | Burns | 348/263 |
| 6,885,392 | B1 * | 4/2005 | Mancuso et al. | 348/36 |
| 6,992,702 | B1 * | 1/2006 | Foote et al. | 348/211.8 |
| 7,057,645 | B1 * | 6/2006 | Hara et al. | 348/208.6 |
| 7,085,406 | B2 * | 8/2006 | Alyassin | 382/131 |
| 7,092,019 | B1 * | 8/2006 | Ogata et al. | 348/263 |
| 7,092,581 | B2 * | 8/2006 | Winsor et al. | 382/274 |
| 7,173,660 | B2 * | 2/2007 | Toji et al. | 348/333.02 |
| 7,301,566 | B2 * | 11/2007 | Nakami et al. | 348/222.1 |
| 2001/0019361 | A1 * | 9/2001 | Savoye | 348/222 |
| 2001/0046381 | A1 * | 11/2001 | Ichikawa et al. | 396/2 |
| 2003/0118225 | A1 * | 6/2003 | Sako | 382/132 |
| 2004/0169870 | A1 * | 9/2004 | Ahmed et al. | 358/1.8 |
| 2005/0057577 | A1 * | 3/2005 | Kuwabara | 345/629 |
| 2007/0147702 | A1 * | 6/2007 | Scoullar et al. | 382/276 |

FOREIGN PATENT DOCUMENTS

| | | |
|---|---|---|
| DE | 19726884 | 10/1998 |
| EP | 0618719 A1 | 10/1994 |
| WO | WO 9962250 | 12/1999 |

* cited by examiner

METHOD AND CAMERA (APPARATUS) FOR OPTICALLY CAPTURING A SCREEN

CROSS-REFERENCE TO RELATED APPLICATION

This application is a continuation of copending International Application No. PCT/EP2003/014817, filed Dec. 23, 2003, which designated the United States and was not published in English.

BACKGROUND OF THE INVENTION

1. Field of the Invention

The present invention relates to large-format cameras and particularly to large-format cameras for optically capturing a screen comprising an array of optical individual cameras.

The cameras for optically capturing a screen, for example a scintillator screen, are used in digital radioscopy.

Currently, for digital radioscopy, mainly three detector types are used. A first detector type uses an image intensifier, whose output signal is captured by an optical camera, for example a CCD camera. The second detector type is based on a semiconductor detector, which mostly consists of silicon, and which converts the visible light generated by a scintillator screen attached to the semiconductor into electrical charge, which is then read out to obtain an image based on the charge after corresponding image processing.

A third detector type is based on a scintillator screen captured by an optical camera. For high resolution applications, the optical imaging is performed via fiber optics. For applications requiring a large-format image, usually refractive optics are used.

The usage of refractive optics is disadvantageous compared to other detector types in that it has unfavorable detection characteristics. This is also the reason for the fact that the latter detector type, which means the scintillator screen captured via a refractive optical system, is only used very rarely. The only fields of application are low cost applications, where the light sensitivity is not of significant importance, and where an X-ray dose supplied to an object is no main issue, respectively.

The above-mentioned X-ray cameras have different disadvantages, depending on detector type. Thus, image intensifiers are very sensitive, but their size is limited. Image intensifiers are only available in cross sections up to about 25 cm and have a low dynamic with regard to brightness differences.

Currently, semiconductor detectors are only available up to a size of 40×40 cm and can only be produced free of any defect with high effort. Further, they provide only low image repetition rates. In the normally used semiconductor detectors based on amorphous silicon, "image lag" is an additional major disadvantage.

Fiber optical X-ray cameras usually image very small areas, which typically comprise an area of only 3 cm×3 cm. An arrangement of many fiber optical X-ray cameras can basically cover large areas as well. However, such arrangements are expensive and costly. Further, dead zones develop between individual camera modules.

Refractive optical X-ray cameras, however, can image large areas. It is a disadvantage, however, that their sensitivity is very low, since usually a lot of light is lost in optical imaging. If, for example, a scintillator screen with a size of 40×40 cm² is to be captured via a refractive optical CCD camera, comprising a light sensor with an effective size of 4×4 mm², the refractive optics of the CCD camera has to achieve a reduction of the screen area by the factor 10,000. Such strongly reducing lenses cause inherently large light losses, which results immediately in a low light sensitivity of such a detector system.

Thus, for example, industrial applications as they appear in quality control of industrially produced parts, such as wheels, or in security technology, where larger subjects are to be screened, require detector systems, which on the one hand, have a large format and, on the other hand, are fast-working. Particularly in X-ray computer tomography, X-ray cameras are required, which image the whole object in order to avoid speed losses. Up to now, in large examination objects, such as automobile wheels, partial images are generated, which are created by time-consuming positioning of the X-ray camera in different capture positions. Then, the partial images are assembled in the computer.

If semiconductor detectors based on amorphous silicon were used for this task, often the required speed could not be achieved, since the above-mentioned image lag of the semiconductor detectors reduces the usable image repetition frequency to 1-2 images per second.

Since depending on the desired resolution, several hundred X-ray images are required in X-ray computer tomography, due to the requirement of assembling an X-ray image of partial images and due to the low image repetition frequency the measurement time for large objects increases so much that the usage of such detectors for fast examination of large objects cannot be considered.

As has already been discussed, a system of scintillator screen and optic camera has been known for a long time. However, due to the bad detection characteristics, which particularly show in a low quantum efficiency (DQE), the application in practice is very rare. One reason for the low quantum efficiency is that a large-format scintillator screen is imaged on a single optical camera with the help of refractive optics. The light-sensitive sensor of the camera, which can be a CCD camera, has an edge length of usually only a few millimeters. The larger the format of the scintillator screen to be imaged, the more the optics has to reduce the image, and the more light is lost by imaging. Depending on the energy, X-ray quantums generate a certain number of light quantums in the scintillator layer. An optimum quantum efficiency is obtained when so much light reaches the optical sensor for every X-ray quantum, that the amount of charge generated by the light on the sensor is higher than the electronical noise of the optical camera. Since more and more light is lost with increasing optical reduction, this structure is disadvantageous.

For imaging large-format scintillator screens, it has been suggested to image a single scintillator screen with four individual CCD cameras. This concept can be found in the system with the name Paladio of the company Leti. This system comprises a specific module for the reconstruction of an image, which is assembled of four individual images from four different individual cameras, in order to optimize the reconstruction length. Further, this module comprises operations for adjusting the images with regard to amplification, offset and also with regard to adjusting geometrical distortions.

The simple assembly of an overall image from individual images, however, is disadvantageous in that certain adjustments can be performed at the individual images prior to assembly, but that the edges of the individual images typically remain visible in the overall image. Thus, clearly visible edges occur, which lead, for example, to artifacts and erroneous evaluations, when an overall image assembled in such a way is subject to image processing, for example to detect edges in the image automatically. This problem occurs particularly in the application of the X-ray technique in an industrial field, where, for example, air inclusions or foreign matter in general have to be detected in a test object, such as an automobile wheel, in order to determine whether such an object fulfills the prevailing specifications or not.

Particularly in an environment where large objects are to be imaged in "one piece" and with high repetition frequency, a price reduction of the system could be obtained by using more than four individual cameras. This is due to the fact that the costs for CCD cameras rise clearly disproportionate to the increase of the effective area of the image sensor.

U.S. Pat. No. 6,002,743 discloses an apparatus and a method for image detection by a plurality of cameras. Several cameras or image sensors are arranged in a camera array. The cameras are arranged in rows and columns, so that a viewing area of a camera overlaps with a viewing area of an adjacent camera. The overall resolution of the image generated by all cameras together is determined by the amount and density of placing the cameras. The resolution or contrast can be increased by increasing the percentage of the overlapping of the several cameras or sensors, which are all directed to the same object area, or to a portion of the same object area. Binning the pixels of the camera can be performed at the camera or in the software of the system. Binning is used to exponentially increase the sensitivity of the individual cameras. Further, the system has to be calibrated first. Therefore, during manual calibration of the system, a geometrical test pattern is placed before the camera array. Every camera is aligned on sub pixel level by using the geometrical test pattern.

Then, a gray level test pattern is placed before the camera array. Then, exposing is performed. A software program compensates gray level deviations and then loads these corrections into a system memory.

SUMMARY OF THE INVENTION

It is an object of the present invention to provide a concept for optically capturing a screen, which is suitable for large-format captures, has a high light sensitivity, and further provides images suitable for automatical image processing.

In accordance with a first aspect, the present invention provides a camera for optically capturing a screen, wherein the screen has an area, and wherein a predetermined overall resolution is intended for the optical capture, having: a camera support with an array of camera mounts; an array of optical individual cameras, wherein every optical individual camera is fixed on an associated camera mount, wherein an optical individual camera has a light sensor and an optical imaging device, wherein the light sensor and the optical imaging device are effective to capture a partial area of the screen area with an individual resolution, which is higher than the overall resolution; and an image processing device for processing digital individual images of the array of optical individual cameras to generate the optical capture of the screen with a predetermined overall resolution, wherein the image processing device is effective to subject the digital individual images to a correction to reduce alignment inaccuracies and/or parameter variations in the array of optical individual cameras, wherein a correction rule determined for an individual image during calibration is used for the correction, and wherein the correction takes place with a correction resolution, which is higher than the predetermined overall resolution and lower or equal to the individual resolution to obtain corrected individual images or a corrected overall image, and to combine adjacent pixels of the corrected individual images and to assemble the images or to combine adjacent pixels of the corrected overall image to obtain the optical resolution with the predetermined overall resolution.

In accordance with a second aspect, the present invention provides a method for optically capturing a screen, wherein the screen has an area, and wherein a predetermined overall resolution is provided for the optical capture, having the steps of: capturing the screen via an array of optical individual cameras, wherein every individual camera is fixed on a camera mount of a camera support, wherein an optical individual camera comprises a light sensor and an optical imaging device, wherein the light sensor and the optical imaging device are effective to capture a partial area of the screen area with an individual resolution, which is higher than the overall resolution; and processing digital individual images of the array of optical individual cameras to generate the optical capture of the screen with the predetermined overall resolution, wherein the step of processing has the following substeps: correcting the digital individual images to reduce alignment inaccuracies and/or parameter variations in the array of optical individual cameras, wherein in the step of correcting a correction rule determined for an individual image during calibration is used, and wherein the correction is performed with a correction resolution, which is higher than the predetermined overall resolution and lower or equal to the individual resolution to obtain corrected individual images or a corrected overall image; and combining adjacent pixels of the corrected individual images and subsequent assembling of combined individual images or combining adjacent pixels of the corrected overall image to obtain the optical capture with the predetermined overall resolution.

The present invention is based on the knowledge that a camera with an array of optical individual cameras, each of which images a partial area of the screen to be imaged, provides both a high light sensitivity and at the same time output images suitable for automatical image further processing, when the correction of the digital individual images is performed with a resolution which is higher than the resolution that the optical capture of the camera should finally have. On the one hand, this concept is advantageous in that the normally available individual cameras can be arranged in an array, without having to perform certain modifications at the camera, for example for resolution reduction. The array of individual images obtained by the individual cameras is then already subject to a correction processing with a higher resolution than obtained anyway by the usage of common individual cameras, in order to align the individual images obtained by the individual cameras in relation to each other, and to eliminate present overlapping areas, if necessary. From the result of the correction including a possibly existing overlapping area elimination, an overall image is obtained with an resolution used for the correction, which is higher than the finally required resolution. This overall image with high resolution can have edges at the borders of the individual partial images.

For edge and resolution reduction, postprocessing of the overall image is performed such that the adjacent pixels are, for example, combined by addition. The number of combined pixels depends on the ratio of correction resolution to finally required overall resolution and can vary from case to case. The integration of adjacent pixels after the correction, however, leads to the fact that edges still visible in the image with high resolution become invisible in the transition from one individual image to another individual image, so that finally an overall image with a desired overall resolution is obtained, which is well manageable with its amount of data, and which further has no or only slightly visible edges at the border from one partial image to the next partial image. The finally obtained overall image is thus very well suited for subsequent image processing, on the one hand, due to the lack of edges and, on the other hand, the reduced amount of data.

In a preferred embodiment of the present invention, CCD cameras are used as individual cameras, which allow the possibility of so-called "binning". Here, a quasi analogous charge addition of adjacent rows and columns, respectively, is performed, already prior or during reading out of the CCD sensor, which is particularly favorable, since this addition is not affected by electronical noise, which would occur when binning were performed in a digital way after reading out an analog/digital conversion.

Such a digital combination of adjacent pixels is merely performed after the application of the correction rules for the individual images to obtain the final resolution reduction and edge elimination.

Thus, the inventive concept allows the usage of common small area CCD cameras with only slightly reducing refractive optics, so that compared to the usage of an individual CCD camera with heavily reducing refractive optics, two sensitivity advantages are obtained. On the one hand, the light loss in the only slightly reducing refractive optics will be much lower than in the strongly reducing refractive optics. On the other hand, an additional sensitivity advantage is obtained by analog binning and by the digital combination of adjacent pixels after the correction, respectively.

Due to the usage of CCD sensors or even only CMOS image sensors, the inventive concept allows image repetition frequencies for large area captures, which are up to a factor of 1000 higher than the repetition frequencies that can be obtained with amorphous silicon detectors for similar image formats.

For correction/adjustment of individual images, specifically determined correction rules are used for every individual camera. These correction rules, however, have to be determined only once, for example prior to delivery of an inventive camera, and remain always the same if the adjustment of the individual cameras is not altered. Such correction rules, for example in the form of look-up tables etc., can easily be hardwired and can generally be performed in a very efficient way, for example via a DSP, since they are merely simple pixel displacements/sortings, which are unproblematical with regard to their required computing effort.

In a preferred embodiment of the present invention, the inventive camera is placed in the optical path of the X-rays behind the scintillator layer, in order to be able to use objectives with short focal length, which are available with higher light intensity than the otherwise required objectives with long focal length. Such objectives with long focal length are required when a camera is not placed in the optical path of the X-rays but outside the X-rays by using mirror optics, in order to protect the optical camera from X-rays.

According to the invention, in a preferred embodiment, a protective layer, for example of lead glass, is employed for the protection of the camera from X-rays passing through the scintillator screen, which is further heatable to counteract adverse effects of the lead glass by X-rays, particularly harder X-rays.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
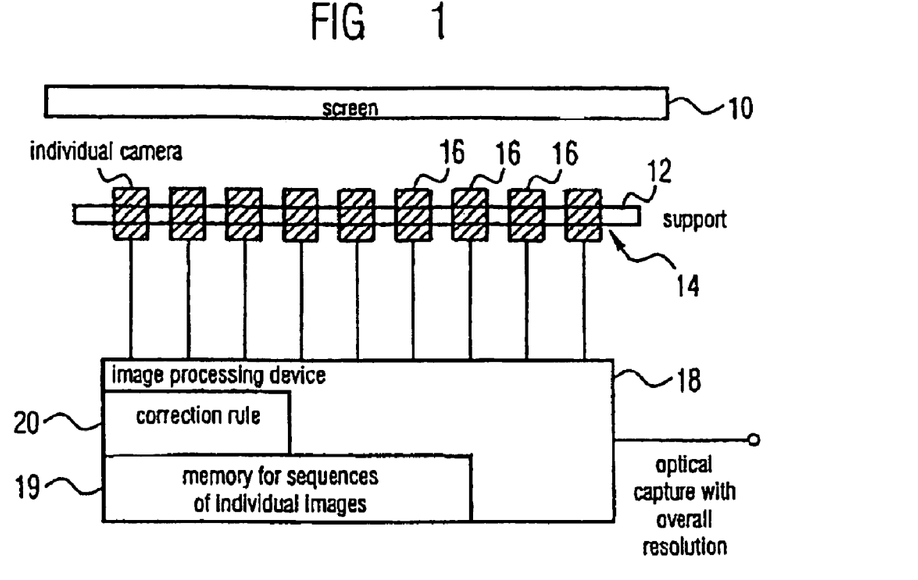
FIG. 1 is a block diagram of an inventive camera for optically capturing a screen.

FIG. 1 shows a schematical block diagram of an inventive camera for optically capturing a screen 10, wherein the screen has a screen area, and wherein a predetermined overall resolution is provided for the optical capture.

The camera comprises a camera support 12 with an array of camera mounts 14. The camera mounts are formed to be able to mount the individual camera 16 in a camera mount. Preferably, the camera support 12 is formed as plate with bores disposed in a predetermined pattern, wherein, e.g., an adjusting screw is provided at every bore in order to insert a cylindrical camera, the cross section of which is slightly smaller than the cross section of the bore, into the bore and to adjust it via the adjusting screw. Alternatives are possible, for example camera supports with slightly conical bores, to place individual cameras with a slightly conical external cross section into the conical bores, so that no adjusting screws or other mounts are necessary, since merely the insert pressure of the camera into the camera support is sufficient.

The camera comprises an array of optical individual cameras 16, wherein every optical individual camera is firmly fixed to an associated camera mount 14. Further, every individual camera comprises a light sensor and an optical imaging device, wherein the light sensor and the optical imaging device are effective to capture a partial area of the screen area with an individual resolution, wherein the individual resolution is higher than the overall resolution of the overall optical capture of the screen 10. Thus, every individual camera 16 provides an individual image with a higher resolution than the finally desired resolution for the overall image, which is assembled of the individual images.

Here, it should be noted that optical arrangements can be implemented in any way. For economical reasons, refractive optics are preferred as optical arrangement, which can comprise one or several lenses, depending on the implementation. Alternative optical arrangements, i.e. optical imaging devices, comprise mirror arrangements, fiber optics, etc., or also a combination of different optical imaging devices.

Further, the inventive camera comprises an image processing device 18 for processing the digital individual images of the arrays of optical individual cameras 16, to generate the optical capture of the screen with the predetermined overall resolution. More specifically, the image processing device 18 is effective to subject the digital individual images to a correction to reduce alignment inaccuracies and/or parameter variations in the array of optical individual cameras 16 and to preferably eliminate them fully. For the correction of an individual image, a correction rule 20 determined during calibration prior to capturing is used, which is typically stored on a suitable storage media in the image processing device 18, or which is even hardwired. According to the invention, the correction is performed with a correction rule determined during calibration, which is higher than the predetermined overall resolution of the finally desired optical overall capture, and which is lower or equal to the individual resolution with which the optical individual cameras provide the individual images. The image processing device 18 is finally effective to obtain corrected individual images or a corrected overall image. Assembling the individual images to an overall image can thus be performed after the correction of the individual images with the correction rule 20 determined for every individual image, i.e. for every individual camera, prior to the final pixel combination step, or after the final pixel combination step. However, for efficiency and quality reasons, it is preferred to assemble first the overall image with the high optical resolution after the correction of the individual images and then add adjacent pixels based on the assembled overall image, to obtain the optical capture with the predetermined overall resolution. The final step of combining adjacent pixels is thus performed to bring the overall image, which is present with the high correction resolution, to the lower desired predetermined overall resolution. Since this final step is already performed with corrected individual images, it has the advantage that possible artifacts at borders of the corrected individual images are blurred and thus become invisible, and that further a resolution reduction takes place in order to obtain no overall image with too high a resolution. Images with too high a resolution are unmanageable for further processing due to their high amount of data. Further, many applications do not require an extremely high resolution, so that a resolution reduction can take place easily.

According to the invention, the fact is used that by using several cameras, the available picture elements (pixel) increase in proportion to the number of cameras. Frequently, as has been explained, no larger number of pixels than the one which the individual camera would provide is required. If now, for example, four optical cameras are used, in that case, four pixels can be added up. This is particularly advantageous when the charge can already be added up on the sensor, as it is done in CCD sensors by so-called binning. In that case, the charge has to be read out only once electronically, and thus, the electronical noise generated by this process occurs only once, so that the overall signal/noise ratio is improved, compared to when every pixel is read out individually and added digitally. In the present case of the 4×4 situation, the correction can either be performed with the highest resolution, which means without having performed binning. Alternatively, however, a 2×2 binning could be performed to perform the correction in a fourfold resolution with regard to the desired overall resolution. Here, a final resolution reduction step by digitally combining adjacent pixels would be possible, for example by addition, wherein always 2×2 pixels, which means four adjacent pixels, are combined, according to a determined combination specification, which can either combine in an overlapping way or in an adjacent way, or obtains a pixel combination of adjacent pixels in any other way. Thereby, an optimally accurate correction with high resolution is possible and at the same time, due to the resolution reduction after the correction, a suppression of artifacts due to edges of individual images is obtained.

In that case, the inventive camera, which is preferably used as X-ray camera, comprises a scintillator screen wherein X-ray light is converted into visible light. As shown in FIG. 1, the inventive camera with the array of individual cameras 16 is behind the scintillator screen 10, wherein each one images a part of the scintillator screen. For specific tasks, where usually a row camera is used, the array of optical individual cameras degenerates into a one-dimensional array comprising a linear arrangement of optical individual cameras. The areas imaged by the individual optical cameras can either abut directly or overlap slightly to reduce the adjustment effort, which would typically occur on the mechanical side.

If the partial images and individual images, respectively, overlap, an electronical correction can be performed, as will be discussed in more detail below. When the partial images overlap, particularly the area imaged in both cameras is discarded after reading out the individual optical cameras, and the optical overall capture, which then also comprises discarding of the overlapping area, is assembled from the corrected individual images, which are subject to discarding, and reduced in resolution.

Figure 2:
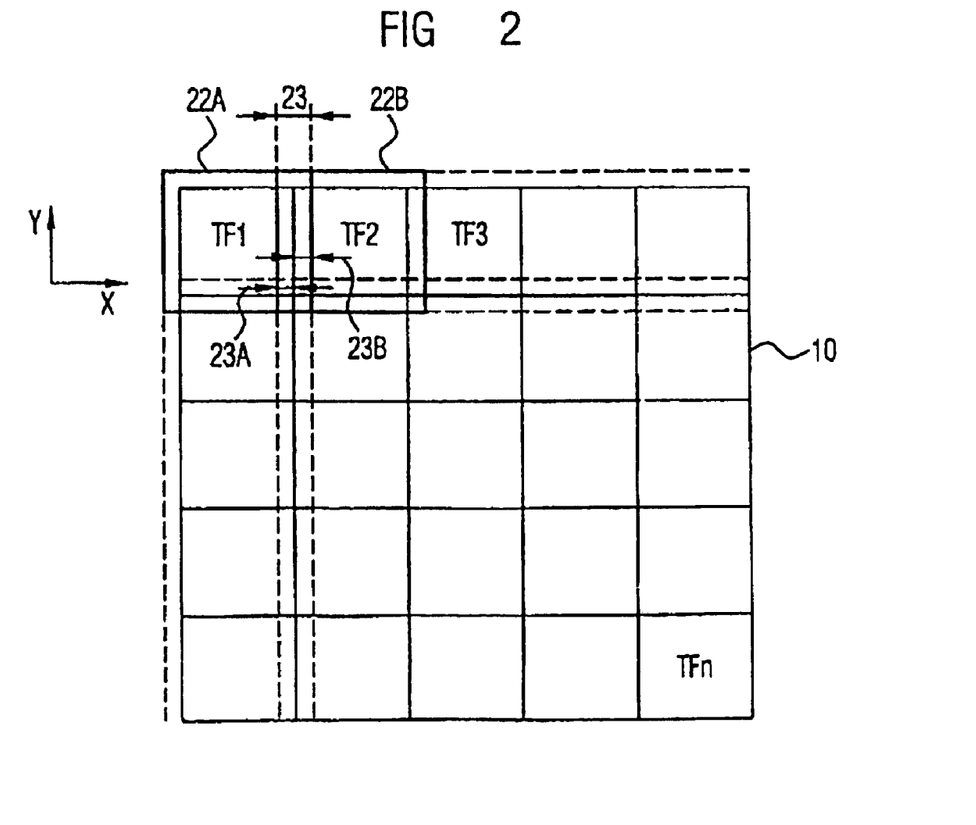
FIG. 2 is a schematical illustration of a separation of the screen into partial areas, wherein further overlapping areas of the individual images are shown.

FIG. 2 shows a schematical arrangement of the screen 10 in the top view, wherein the screen is divided, for example, into 25 partial areas TF 1, TF 2, TF 3, . . . , TF n, as shown in FIG. 2. It is obvious that an arbitrary separation of the screen 10 into partial areas can be performed. Preferred numbers of partial areas are above 10 partial areas and particularly in the range of more or equal to 25 partial areas.

In detail, the individual images generated by the individual cameras 16 are designated by 22a, 22b, . . . in FIG. 2. Further, overlapping areas are also shown in FIG. 2. The individual images 22a, 22b, which are generated by the first individual cameras on the left hand side in FIG. 1 have an area which is larger than the area of the finally obtained partial areas (TF 1, TF 2), which are finally assembled to the overall image. The individual image 22a in FIG. 2, which will finally be the partial area TF 1, is shown with a thick perimeter. In the idealized illustration shown in FIG. 2, the form of the individual image 22a is a rectangle, which has a larger area than the rectangle representing the partial area TF 1, wherein all four sides of the individual image 22a are outside the limiting lines of the partial area TF 1, so that the partial area TF 1 generated from the individual image 22a after the correction lies fully within the individual image 22a. Correspondingly, the individual image 22b is shown in FIG. 2, from which finally the partial area TF 2 will be generated. The individual images 22a, 22b have an overlapping area 23, where the individual images overlap. The overlapping area comprises part of the partial area TF 1 and part of the partial area TF 2. In the overlapping area elimination by the image processing device 18 according to the stored correction rule, the partial area of the overlapping area 23 lying outside the partial area TF 1 and extending into the partial area TF 2 (and also into the other adjacent partial areas) is eliminated from the individual image 22a. The individual image 22b is handled correspondingly to generate the corrected individual image 22b, which finally represents the partial area TF 2.

Generally, even in a parallel arrangement of the light-sensitive sensors of the optical camera, it can be expected that the rows and columns, respectively, of the light-sensitive sensors are not disposed exactly in parallel, since the light-sensitive part of the sensor is usually not exactly parallel to the perimeter of the sensor housing. For adjusting the individual sensors, different possibilities are preferred, depending on the application.

According to a first embodiment of the present invention, a mechanical correction is performed in that the optical cameras are disposed in a rotatably suspended manner in the camera support 12 (FIG. 1). Here, every camera could be designed, for example, as cylinder. The individual cameras are then arranged in matrix form in a pivoted way. The adjustment of the individual cameras is performed, for example, with maximum resolution of the optical camera by rotating the camera and monitoring the camera image. For that purpose, for example, an arrangement of parallel lines is imaged as calibration pattern. All cameras are adjusted such that every line is exactly parallel to a row and column, respectively, of the sensor. After adjustment, which is performed by mechanically influencing the individual cameras and subsequent adjustment, for example via an adjusting screw or via pressing the camera into a conical support, typically, only a vertical and horizontal, respectively, offset will be present. This vertical and horizontal offset, respectively, will show in that a parallel line extending across several partial areas on the calibration pattern, which extends, for example, via the whole row of the screen 10, which is defined by the partial area TF 1, the partial area TF 2 and the partial area TF 3, will be imaged in the corrected individual images as partially parallel line, wherein the individual lines, however, are still displaced in relation to each other in y direction. This means that an imaged horizontal line in the individual image 22a on the right side of the individual image 22a ends on a different y position than a line in the individual image starts for the partial area TF 2. Above that, with regard to an x offset, the line in the individual image 22a could already end prior to the end of the overlapping area 23 in the partial area TF 2, and correspondingly, the line in the individual image 22b could start prior to the border of the overlapping area 23 in the individual image 22a.

Since the overlapping areas of the individual images are still present at this time, the vertical and the horizontal offset can also be corrected manually or electronically. This can be performed simply based on the overlapping area. The viewer can then adjust an x or y offset for corresponding cameras, which generate the individual images 22a, 22b, and vary this offset for so long until the calibration line and the corresponding calibration points, respectively, overlap exactly in the overlapping area. The found x and y offset, respectively, is then programmed in a fixed way for every individual image, i.e. for every individual camera in the image processing device and serves, during normal operation, as the correction rule 20 stored in the image processing device 18 (FIG. 1). In other words, the x offset and the y offset, respectively, occurs in that whole rows and columns, respectively, of the overlapping area 23 are discarded, in that for one camera more rows are discarded, so that the same has a different y offset than another camera, where less rows of the overlapping area are discarded, which results in another y offset, which means in a different correction rule for this individual camera 16 (FIG. 1).

Alternatively, the light-sensitive sensors of the individual optical cameras can be disposed as parallel as possible in relation to each other, since it can be assumed that individual cameras already have a relatively good rotatory alignment with regard to the optical axis. Then, parallel lines are imaged again. If individual sensors are rotated in relation to one another, the partial images are imaged in non-parallel lines. Rather, the lines will run in an angle to the rows and columns of the light-sensitive sensors, respectively. In that case, the angle between the imaged lines and the rows and columns of the sensor, respectively, is determined for every sensor. The individual pixels (picture elements) of the light-sensitive sensors are re-sorted after reading out the individual optical cameras by a calculating unit, such that in the overall image, continuous parallel lines are formed again, which results in a rotation of the image.

The rotary electronical correction, which results in an address re-sorting of the pixels, which can, for example, be programmed in a fixed way for every individual camera via a look-up table, can further be combined with the vertical and horizontal correction, respectively, which is typically done, which is described above, and will be discussed below in more detail with regard to FIGS. 4a, 4b, 4c and 4d.

In the following, preferred embodiments for the scintillator layer will be discussed. The resolution of a scintillator decreases with increasing thickness of the scintillator. This means that thinner scintillators have a higher resolution but are more expensive than thicker scintillators. On the other hand, the X-ray absorption decreases also with thinner scintillators. This has two inherent problems. The one is that the quantum efficiency is decreasing. The other is that less X-rays are absorbed and thus a higher effort has to be made for protecting the cameras and for protecting operators close-by. Design specifications for the scintillator are thus that a scintillator as thick as possible has to be used, the resolution of which is just sufficient for an application. Then, an optimum compromise between cost and quantum efficiency is obtained. Thus, in a preferred embodiment, a scintillator is used, whose resolution only slightly exceeds the finally desired overall resolution, which will only be present after the correction, which thus has a resolution which is about 10% above the overall resolution and which is preferably equal to the overall resolution. These considerations play no part for the calibration of the camera, since a calibration pattern, for example of paper or cardboard, is inserted at the height of the scintillator instead of the same, which can basically be produced with a resolution of almost any height.

In the following, it will be explained with reference to FIG. 3, which different resolutions are used by the inventive camera illustrated in FIG. 1 prior to capturing the individual images up to the output of the optical capture with predetermined overall resolution of the overall screen. First, capturing the screen takes place with maximum resolution of an individual camera in step 30. Since many individual cameras are used, a very high resolution is obtained by the individual image captures, i.e. by the individual cameras, compared to the final optical overall capture with an individual camera and heavily decreasing optics. A typical resolution is a line-space resolution of 50 µm. However, a low light sensitivity is obtained simultaneously with the high resolution. optionally, in step 32, the resolution can already be reduced by performing analog binning, for example when CCD light sensors are used as light sensors of the individual cameras 16 (FIG. 1). 4×4 binning is used for the described example, which corresponds to an increase of the light sensitivity by a light sensitivity factor of 16. At the same time, the pixel area, which means the geometrical area represented by a pixel, increased 16 fold. Thereupon, individual images with a correction resolution result, which can then be used to perform the inventive alignment correction 34. A line-space resolution preferred for the correction is typically about 200 µm.

By performing the offset correction with high resolution, a precise correction can be achieved. The correction resolution is still higher than the finally desired predetermined overall resolution of the optical capture. Thus, in a further step 36, a reduction of the resolution is performed by digital combination of adjacent pixels 36. Here, for example a combination of four pixels, i.e. of two adjacent row pixels and two adjacent column pixels, is desirable. This corresponds to a further light sensitivity gain by a light sensitivity factor LEF=4. Finally, in a step 38, the capture with predetermined overall resolution is obtained, which has, for example, a line-space resolution of 400 µm. Thus, it can be seen from FIG. 3, that individual images with high resolution and low light sensitivity become the overall capture with low resolution but high light sensitivity. The light sensitivity, however, is not only obtained, as explained, by performing the optional step 32 prior to the correction and the step 36 after the correction of the pixel combination, but already by using individual cameras having refractive optical systems, which merely obtain a low reduction, for example by a factor 5 or even less, compared to an individual camera in the prior art for an overall capture of the screen, whose refractive optical system has to obtain a reduction of 100 or more.

Thus, according to the invention, optical sensors are used, which have a higher resolution than required for the final application. If, for example, an X-ray camera of the format 40 cm×40 cm is assembled of 100 partial images of the format 4 cm×4 cm and CCIR sensors are used, every partial image would consist of more than 400,000 pixels. This means about 40 million pixel for the overall image. However, images with this resolution can normally not be used, which is why the number of pixels is reduced by adding adjacent pixels. If CCD sensors are used, the charge of adjacent pixels can analogously be added up on the sensor itself, which means, as illustrated with regard to step 32 in FIG. 3, a binning operation can be used. Here, it is preferred to use as many analog additions as possible, compared to the digital addition, since noise will be generated during reading out and converting the analog signal. If every pixel is read out and digitalized individually, this noise will be generated for every pixel. If, however, first, adding is performed analogously, the noise will be generated only once. For example, in a 4×4 binning, i.e. an analog addition of 16 pixels, which lie in four adjacent rows and columns, respectively, 16 times more charge is collected in a resulting pixel, whereby the light sensitivity of the optical camera increases.

As has been described above, the detection sensitivity for X-rays of an X-ray camera based on an optical camera (image of a scintillator with refractive optics) is limited by light losses. The light losses can be reduced by binning. It has been found out that it is advantageous to image only small partial areas of the scintillator, for example 3 cm×3 cm, onto a CCD sensor in the CCIR format. Then, every pixel has to image only an area of the scintillator of about 50 µm×50 µm without binning. If only a resolution of, for example, 400 µm is required, 4×4 pixels can be binned, and the correction can still be performed in a higher resolution than the finally obtained resolution. Thus, all in all, the light sensitivity is increased by the factor 4×4×2×2 (steps 32 and 36 of FIG. 3), i.e. by a factor of 64.

According to the invention, adjusting the partial images is performed with a higher resolution. Thereby, the correction can be made more precisely. Particularly, it can be found out easier, which image elements belong to a continuous line of a calibration pattern on the level of the scintillator. Thus, according to the invention, the analog addition (binning) is not performed up to a desired overall resolution, but a higher resolution is generated first. As illustrated with regard to FIG. 3, first, 4×4 pixels are binned, which results in a resolution of 200 µm. After adjustment of the partial image (rotation), translatory offset correction (=discarding overlapping areas) has been performed, 2×2 adjacent pixels are added digitally. This method thus generates a slightly higher noise compared to full binning on the desired overall resolution. But in that way the adjustment is made so precisely that finally in the image with 400 µm resolution no more distortions can be seen, and particularly no edges of the individual partial images and partial areas (TF 1, TF 2, TF 3, TF n of FIG. 3) can be detected.

Figure 4A:
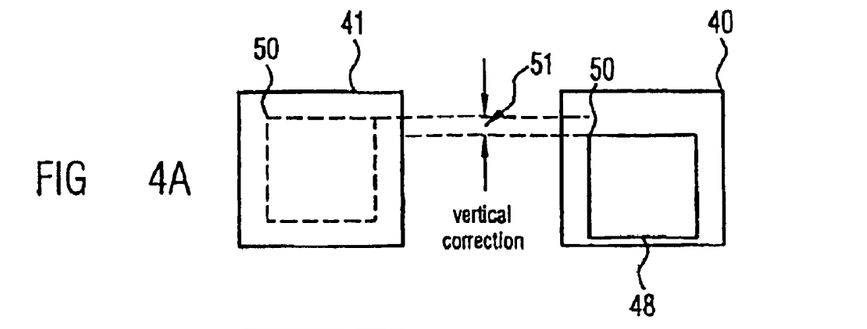
FIG. 4a is a comparison of an uncorrected individual image and a corrected individual image in vertical correction.
Figure 4B:
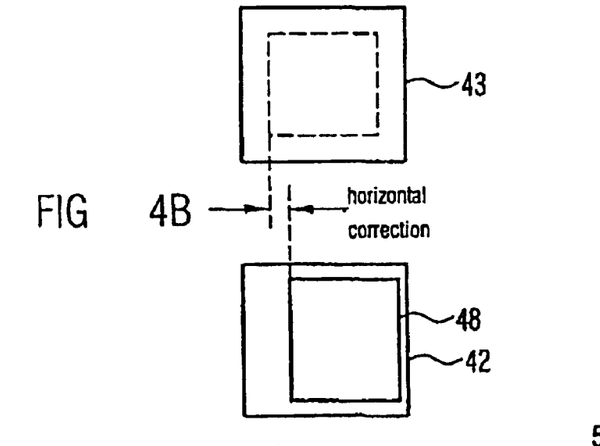
FIG. 4b is a comparison of an uncorrected individual image and a corrected individual image with horizontal correction.
Figure 4C:
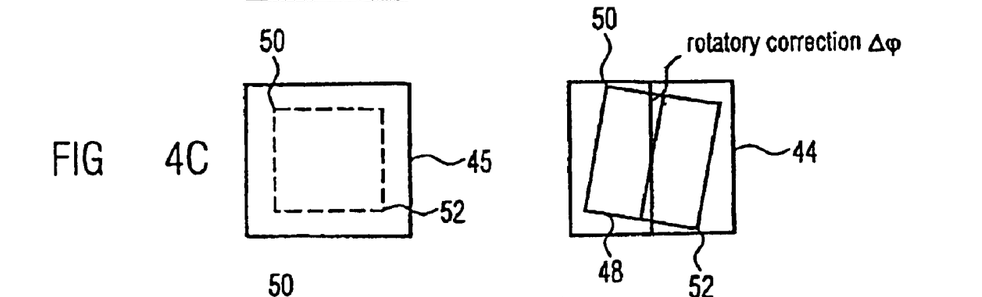
FIG. 4c is a comparison of an uncorrected individual image and a corrected individual image with rotatory correction.

In the following, corresponding corrections will be discussed with reference to FIGS. 4a to 4d. FIG. 4a shows an example for a vertical correction. FIG. 4b shows an example for a horizontal correction. FIG. 4c shows an example for a rotary correction, while FIG. 4d finally illustrates an example for a scaling correction. In FIGS. 4a to 4d, a real individual image 40, 42, 44, 46 prior to a correction is always compared to the corresponding individual image 41, 43, 45, 47 after correction. Thus, the individual image in FIG. 4a represents capturing a rectangle 48, whose left upper corner 50 as reference point is offset compared to an ideally desired reference point 50 in the corrected individual image 41 via a vertical offset 51, which is also referred to as vertical correction in FIG. 4a. The correction rule 20 to be performed for the individual image 40 in FIG. 4a would for example be to shift the pixel addresses of the individual image 40 always by the vertical correction 51 towards the top. If, for example, the addresses in FIG. 4a are continuously numbered from top to bottom, the correction rule will be to reduce every y address of a pixel in the real individual image 40 by a Δ value, which is given quantitatively by the amount 51. This leads to the fact that the overlapping area above the square 48 in the shifted individual image becomes so large as indicated in the corrected individual image 41, and that the overlapping area below the square 48 becomes already very small. It can be seen from FIG. 4a that a maximum vertical correction is determined by the used overlapping area. A correction far beyond the overlapping area is not possible, since in that case the pixel would run out, for example for the lowest row of the square 48. A pixel interpolation could be performed merely for a very small amount of missing pixels.

Since the correction has a higher resolution than the resulting overall image, a number of rows and columns, respectively, could be interpolated, so that a correction via rows/columns is possible, which assume slightly higher values than defined by the overlapping area set by the individual cameras.

In FIG. 4b, analogous to the procedure described in FIG. 4a, a horizontal pixel correction is performed in order to generate a corrected individual image 43 from the real individual image 42, where the square 48 is imaged too far to the right.

Analogously, a rotary correction can be performed as well. Therefore, an x and y deviation of, for example, the left upper corner 50 of the square 48 to the desired reference point 50 on the calibration pattern is determined. To further determine that it is a rotatory deviation and not a horizontal or vertical deviation, for example, the right lower corner 52 of the square is used as further reference point. Then it can be determined from the deviations of the reference points in the real individual image 44 from the reference points in the ideal individual image 45, that it is a rotatory correction by a certain angle Δφ. After determining the center point of the square as further reference point, a corresponding correction can be performed for every pixel of the square 48, which will increase with regard to the x correction amount and the y correction amount from small values around the center point to larger values at the edges of the square 48.

Figure 4D:
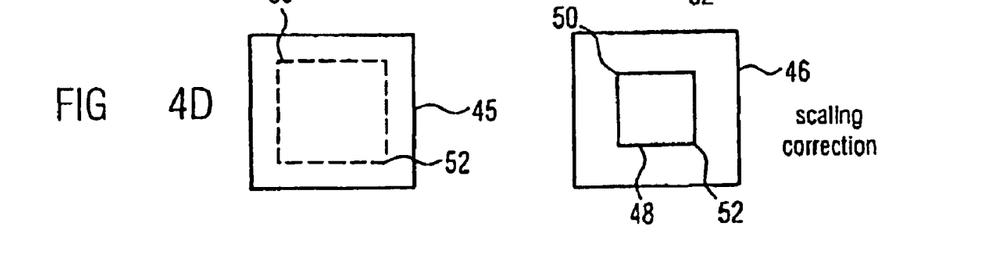
FIG. 4d is a comparison of an uncorrected individual image and a corrected individual image with scaling correction.

The inventive method can also perform a scaling correction, as shown in FIG. 4d. Therefore, for example, the left upper corner 50 and the right lower corner 52 can also be used as reference points of the square 48. A simple distance determination of the diagonal between the left upper corner 50 and the right lower corner 52 compared to a diagonal of the imaged square on the calibration pattern will show whether the really illustrated square 48 has been reduced too much by the refractive optics of an individual camera, as it is exemplarily illustrated in FIG. 4d. In the same way, it could also be determined whether the refractive optics has achieved too small a reduction than intended. Thus, all lenses of an inventive camera have a nominal reduction, typically with a tolerance towards the top and the bottom, which does not need to be too small due to a subsequent electronical correction, so that here inexpensive lenses can be used as well in order to reduce the price of the camera.

Here, a correction rule would be to readdress all pixels of the individual image 46 starting from a certain scaling correction factor, in order to generate the ideal corrected individual image 47 from the real individual image 46.

Based on the pixel information in the overlapping area after the geometrical correction has been performed according to the procedure described in FIGS. 4a to 4d, further, a brightness correction can be performed in the overlapping area in order to balance out brightness differences of the individual cameras. If it is found out, for example, that the pixels in the overlapping area of the individual image 22a of FIG. 2 are all brighter than the pixels of the individual image 22a in the overlapping area 23, the pixel of the one individual image can be brightened, or the pixel of the other image can be darkened, or an average value between the two individual images could be set for both adjacent individual images. For brightness correction, it is preferred to consider all individual images in a row and a column in order to ensure that all individual images of the camera can be corrected to a common value. In that case, it is not necessarily required that further provisions are made for the overlapping area, the same could remain in principle and would not be noticed in the assembled individual image, since the pixels in the overlapping area have the same value.

However, according to the invention, for quality improvements and artifact avoidance, it is preferred to eliminate pixels in the overlapping area 23, as long as this has not already been performed together with the horizontal and vertical correction, respectively. This can be performed in several ways. For overlapping area elimination, the whole overlapping area of the individual image 22a could be eliminated, so that part of the partial area TF 1 is imaged by the partial area TF 2. Alternatively, and this way is preferred, in the example illustrated in FIG. 2, the overlapping area 23 is eliminated by half and according to the performed correction, respectively. Thus, part of the overlapping area 23 illustrated in FIG. 2 by 23a is eliminated from the individual image 22b, while the other part 23b is eliminated from the individual image 22a, so that every individual camera images exactly one partial area. This overlapping area elimination in that a camera images exactly one partial area and not any pixels of adjacent partial areas, can be performed best by using calibration patterns not only with vertical and horizontal lines, respectively, but by using a square-type calibration pattern, which basically looks as shown in FIG. 2. The grid lines drawn in the screen in FIG. 2 represent exactly the separation of the screen into individual images. Cross points and corners of the grid lend themselves now as reference points for the horizontal and vertical correction, respectively. Thus, the square 48 imaged in FIG. 4a, FIG. 4b, FIG. 4c and FIG. 4d, would be exactly the section of the pixels of an individual camera. In this preferred case, the image processing device 18 will set all pixels within the image square 48 to the corresponding position in an image memory for the overall image as correction rule.

Figure 5:
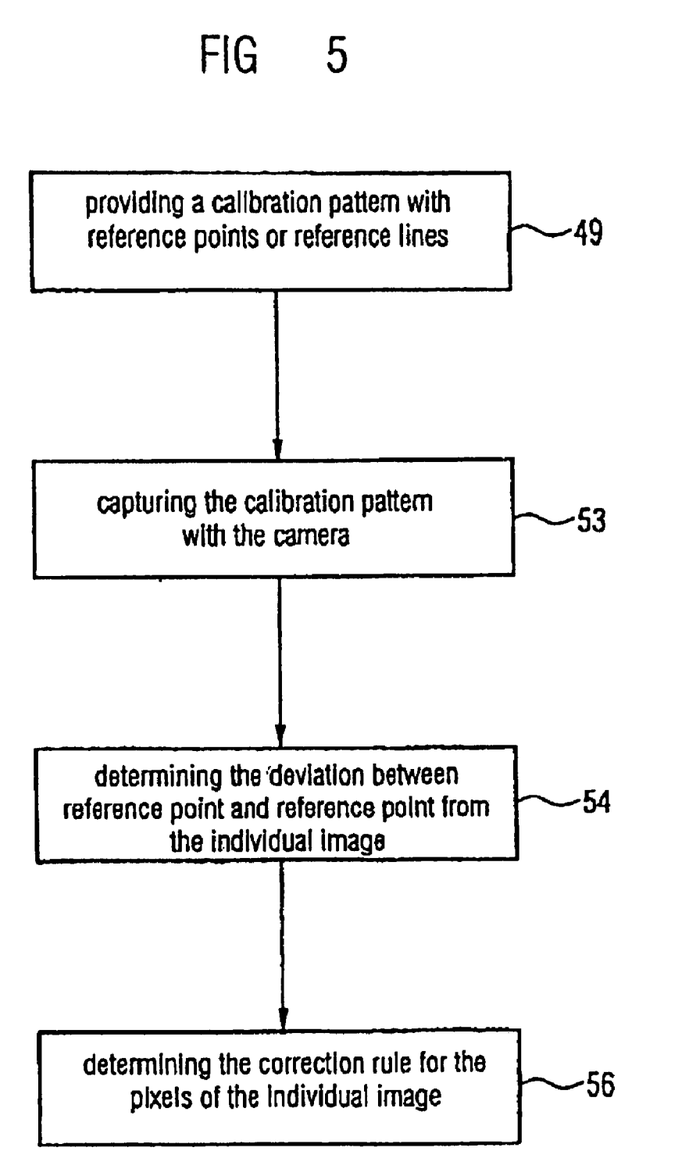
FIG. 5 is a flow diagram of the inventive method for calibrating the camera.

A calibration procedure prior to a capturing process would be performed as shown in FIG. 5. First, a calibration pattern with reference points or reference lines (49) is provided. It can be seen that a reference line can be made up of several reference points. Then, the calibration pattern provided in step 49 will be captured with the camera, which means the array of individual cameras, in a step 53. Then, according to the procedure illustrated exemplarily in FIGS. 4a to 4d, a deviation between a reference point of an individual image and a reference point predetermined by the calibration pattern is determined (step 54). From this deviation, a vertical correction, a horizontal correction, a rotatory correction, a scaling correction or a brightness correction is determined, which will finally be determined as correction rule for the pixel of a corresponding individual image (step 56).

In step 56, a correction rule is obtained gradually for every individual image, i.e. every individual camera, for all, for example 100, individual cameras in the array of individual cameras. Depending on the array size, the calibration process can take a significant amount of time. However, this is not critical, since this calibration process has to be performed only once, namely prior to delivery of the inventive camera. Since all individual cameras are fixed to the camera support, the correction rule will not change for an individual camera during operation of the camera. It is a further advantage of this fact that the correction rule for the individual images are merely simple pixel address manipulations or simple pixel value manipulations, which can easily be carried out in software, or which can even be programmed in hardware in the image processing device 18 of FIG. 1 to obtain a fast correction, such that a real-time camera can be obtained, since the pixel manipulations can be performed in a fast way during the operation of the camera. Obviously, the calibration can be automated by using appropriate image processing methods and by using known calibration patterns.

Figure 6:
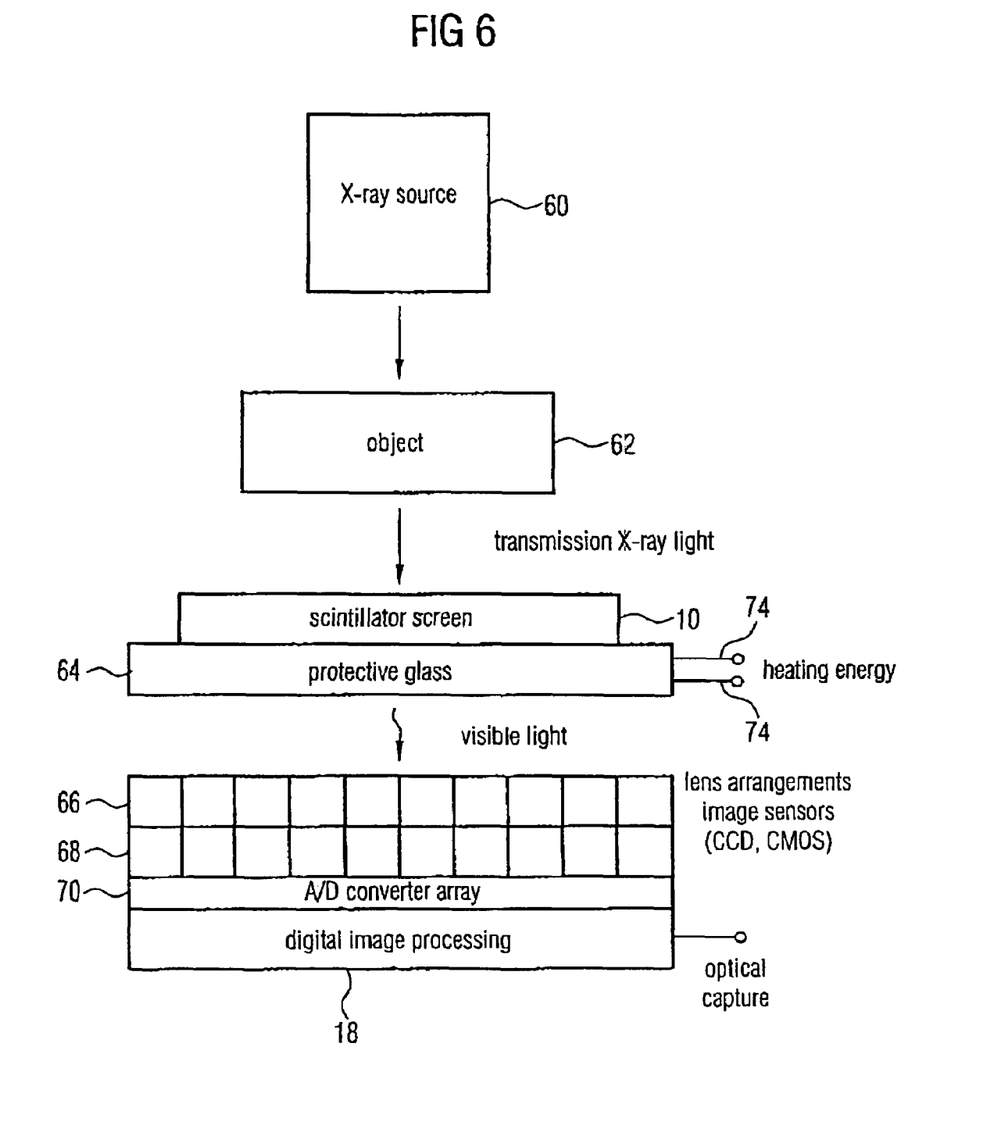
FIG. 6 is a representation of an overall scenario in digital radioscopy, where the inventive camera can be used.

As has been explained, the inventive camera is particularly suitable as X-ray camera for imaging a scintillator screen. A corresponding scenario is illustrated in FIG. 6. An X-ray source 60 radiates on an object, which is finally to be imaged and is indicated by 62 in FIG. 6. Obviously, objects can be medical objects. The inventive camera however, will be particularly used in industrial fields, where the radiation dose is not so critical, but where speed and image repetition frequency are required. Corresponding objects 62 are, in the industrial application, for example, automobile wheels or objects to be screened during security control in airports, etc. The transmission X-ray light passing through the object 62, which means has not been absorbed by the object 62 falls then on the scintillator screen 10. The scintillator screen 10 absorbs a portion of the transmission X-ray light dependent on the wavelength of the X-ray light and converts the same into optical radiation. The optical radiation passes through a protective glass 64 transparent for the optical radiation and impinges as visible light on the inventive camera, which consists of the array of individual cameras schematically shown in FIG. 6, wherein every individual camera has a lens arrangement 66 followed by, for example, CCD or CMOS image sensor 68. Further, downstream of the image sensor, there is an analog/digital converter array 70, which feeds the digital image processing device 18 (FIG. 1), to finally obtain the optical capture with the desired overall resolution.

The protective glass pane is provided to protect the inventive camera and particularly the lens arrangement 66 and the image sensors 68 from an X-ray radiation possibly not absorbed by the scintillator screen 10. The protective glass pane 64 is formed such that it is transmissive in the optical range, but strongly absorbing for X-rays. Therefore, lead glass is very well suited. In currently known X-ray systems, where a scintillator screen is imaged with refractive optics onto an optical camera, the protection of the optical camera from the X-ray radiation is normally obtained by imaging the image via a mirror onto the optical camera, and by arranging the optical camera outside the X-ray radiation range. A possible reason therefore can be that the optical transmission of lead glass decreases through radiation with X-ray radiation so that after longer radiation a large part of the light would be absorbed in the lead glass.

According to the invention, this effect is counteracted by designing the protective glass pane 64 in a heatable way, and providing the same with heating energy via terminals 74. As has been described, for example, in patent specification DE 19726884C1, color centers generated by radiation in the glass can be decreased again by heating. Experiments have shown that herefore temperatures in the range of 100 to 150° C. are sufficient. With low radiation exposure, a longer storage at room temperature, which means temperature between 20 and 30° C., will be sufficient.

The inventive arrangement with protective pane instead of a mirror illustrated in FIG. 6 has on the one hand, the advantage of a compact structure. On the other hand, objectives with short focal length can be used, which are available with higher light intensity than the otherwise required objectives with long focal length. Objectives with long focal length are particularly required in an arrangement with mirrors with a large number of optical cameras, since the whole light path from the scintillator to the optical sensors is also determined by the size of the scintillator screen. Particularly, the optical sensors have to be disposed outside the radiated area.

The scintillator screen 10 required for converting the X-ray radiation into visible light can either be deposited on a separate support or directly on the protective pane.

It is further preferred to design the protective glass pane 64 in optically coated way to avoid reflections and so called "ghost images".

A preferred embodiment of the inventive camera is fully embodied on a board. In that way, normal boards with the size 20×20 cm² or 40×40 cm² can easily be produced. The semiconductor sensor elements are then directly mounted on the board, without housing etc. Typically, lenses are already disposed on the "naked" sensor elements. Further, the associated A/D converters and the image processing circuit are also embodied on the board. Depending on the requirements, the image memory can also be embodied on the board or it can be connected externally via a corresponding interface.

As has already been explained, in CCD cameras, the reduction of the number of pixels can be realized by binning. If a lot of pixels are combined, such as 10×10 pixels, the number of effective pixels to be digitalized (binned pixels) becomes small. Since the optical sensor has, for example, 1000×1000=1,000,000 pixels, only 100×100=10,000 pixels have to be digitalized after a binning of 10×10. If this resolution is sufficient as correction resolution, i.e. if it is higher than the finally desired overall resolution, relatively low digitalization rates can be realized. Such digitalization rates are in the range of 10 MHz. Then, the CCD cameras can be read out with high image frequency to realize a high speed X-ray camera, which provides, for example, 1000 images per second.

If CMOS cameras are used instead of CCD cameras, the possibility of binning is inapplicable. However, for example, every fourth pixel could be read out in order to reduce the data rate. But this would also result in a sensitivity of the camera lowered by a factor of 4. Thus, according to the invention, it is suggested, particularly with the usage of CMOS cameras, but also with the usage of other light sensors, to store every digitalized partial image in a separate image memory at first.

Since only low data rates occur per partial image, long image sequences can be stored. Due to the low digitalization rate, AD converters with high conversion depth, for example 12 bit, can be used, instead of the 8 bit converters common in high-speed applications, whereby higher brightness differences can be detected in an image. According to the invention, the partial images are only read out from the separate memories and assembled to image sequences after termination of high-speed capturing, or merged in real time, i.e. in-line with image capturing, and then also read out in real time.

According to a first realization example, an X-ray camera is used, which allows a resolution of 400 µm×400 µm per pixel (1000×1000 pixel) on an active area of 40 cm×40 cm. Further, a vertical optical path of the X-ray radiation from bottom to top is assumed, as illustrated in FIG. 6. The scintillator is deposited on a mechanically stable slowly absorbing support material, viewed in the direction of the radiation on the backside of the support material. If the support material is made of glass, it can be heated. The support is not illustrated in FIG. 6. A lead glass pane heated up to 100 to 150° C. lies below the support in sufficient distance. Heating is performed, for example, electrically via an optically transparent heating film or an also optically transparent directly deposited layer, which acts as electrical resistor layer and is supplied with heating energy via terminals 74. Alternatively, the scintillator can also be deposited directly on the heated lead glass pane, which then acts as support material.

Below the lead glass pane, 10×10 optical CCD individual cameras with each at least 1024×1024 pixels are disposed in a matrix of 4 cm×4 cm. Every camera detects a partial image, which is slightly larger than 40 mm×40 mm, in order to realize the overlapping area 23 (FIG. 2) required for the correction as described in FIG. 4a to 4d. The optical imaging is chosen such that a pixel images 40 µm×40 µm. Every camera can be described in different binning stages, for example slightly binned for adjustment purposes or higher binned for electronical correction, wherein the higher binning for the electronical correction is also used during normal operation of the camera. Provided that pixel combining required after electronical correction to the desired overall resolution is still possible.

Figure 3:
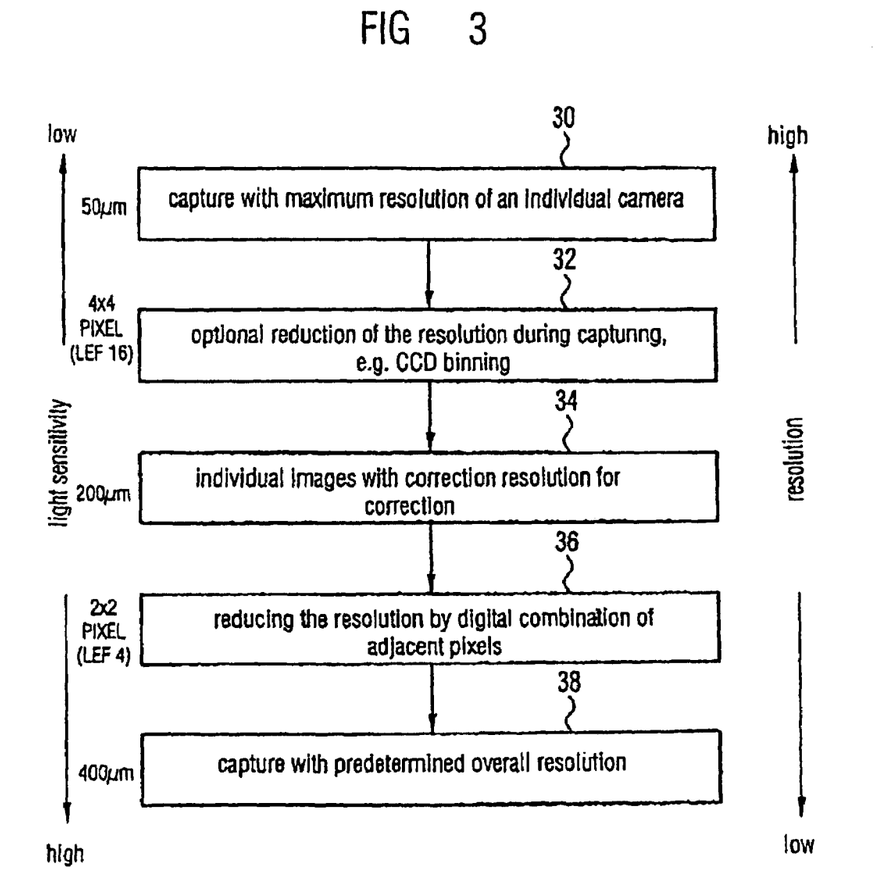
FIG. 3 is a schematical illustration of the development of the image resolution from capturing the individual images to the output of a capture with predetermined overall resolution.

For the adjustment, a test pattern is disposed on the level of the scintillator, which, as has been explained with regard to FIG. 3, has parallel lines every 40 mm in vertical and horizontal direction. Thus, the pattern forms 40 mm×40 mm sized squares, which preferably represent the limiting lines of the individual partial images as well. First, the test pattern is adjusted such that rows and columns are about parallel to the matrix arrangement of the cameras. Then, the individual cameras are rotated such that the rows and columns of the images are approximately parallel to the rows and columns of the test pattern. Then, for a parallel displacement, the test pattern is displaced to a position where every camera fully images one square.

The fine-adjustment is performed first by capturing the image binned to about 200 µm×200 µm one after the other for every camera and rotated by digital processing such that the rows and columns of the image are exactly parallel to the rows and columns of the test pattern. Then, all pixels outside the limiting lines of the test square are discarded. For the final representation during normal operation, 2×2 pixel of the remaining pixels of the partial images are each combined digitally, i.e. preferably added.

In an alternative realization example, a TDI X-ray row camera is made up by a one-dimensional array of individual cameras, which allows a pixel resolution of 0.25 mm on an active length of, for example, 50 cm. Optical TDI cameras are known from U.S. Pat. No. 3,833,762. In these cameras, charge is shifted synchronously to the image of the object on the CCD sensor, in order to increase the effective exposure time and to obtain a higher sensitivity of the camera.

A linear arrangement of four sensors is used in the embodiment, which each have 1024×256 pixel to obtain an optical imaging of 50 cm long scintillator strip. The protection of the optical camera from X-ray radiation is performed in that every camera is disposed outside the radiation range and images the scintillator via an optical mirror. Alternatively, as illustrated in FIG. 6, the protective glass pane 64 made preferably of lead glass can be used. For adjustment, the TDI cameras are operated in a full image mode. Therefore, the test pattern is exposed with short light flashes and 256 subsequent rows are represented as image. If the light flashes occur after 256 rows, a full image representation is achieved, even in the TDI mode. If a continuous illumination would be used, all lines, which are peripheral to the feed direction of the charge, would be depicted "blurred".

The further fine adjustment is performed as described above. One main reason for using several sensors is the high light loss when using only one sensor. The overlapping of the individual sensors is preferably chosen such that every sensor provides effectively 1000 pixel. Since four sensors are used, a maximum resolution of 500 mm/4000=125 µm is obtained.

In this embodiment, the camera has an active width (scan width) of about 31 mm in the scanning direction. For certain applications, it can be required to limit this width via apertures. In that case, the number of used rows is reduced by the apertures.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is

1. A camera for optically capturing a screen, wherein the screen has an area, and wherein a predetermined overall resolution is intended for the optical capture, comprising:
   a camera support with an array of camera mounts, which are effective to build an optical arrangement comprising:
      an array of optical individual cameras, wherein every optical individual camera is fixed on an associated camera mount, wherein an optical individual camera has a light sensor and an optical imaging device, wherein the light sensor and the optical imaging device are effective to capture a partial area of the screen area with an individual resolution, which is higher than the predetermined overall resolution, wherein the light sensor and the optical imaging device are arranged such that the partial areas of the optical individual cameras partially overlap each other; and
   an image processing device for processing digital individual images of the array of optical individual cameras to generate the optical capture of the screen that has an area, with the predetermined overall resolution,
      wherein the image processing device is effective to subject the digital individual images to a correction to reduce alignment inaccuracies and parameter variations including scaling variations in the array of optical individual cameras, wherein a correction rule determined for an individual image during calibration is used for the correction, and wherein the correction results in corrected digital individual images having a correction resolution which is higher than the predetermined overall resolution and lower than or equal to the individual resolution used used when capturing the partial areas of the screen area;
      wherein the image processing device is effective to assemble, with overlapping areas of the corrected individual images eliminated, the corrected individual images to obtain a corrected overall image having the correction resolution, and
      wherein the image processing device is effective to combine adjacent pixels of the corrected overall image to reduce the resolution thereof down to the predetermined overall resolution.

2. The camera according to claim 1, wherein the optical individual The cameras are mounted on the camera support such that the shortest distances of the optical individual cameras to the screen are substantially constant and only vary within a tolerance range.

3. The camera according to claim 2, wherein the image processing device is configured to perform, within the correction, a geometrical correction on the digital individual images after the binning such that the digital individual images maintain the intermediate resolution.

4. The camera according to claim 1, wherein the optical individual cameras are mounted on their associated camera mounts such that they are mechanically adjusted in relation to each other with regard to a rotation of the light sensor around an optical axis of the optical individual camera, which the light sensor comprises, so that a straight line extending across partial areas of the screen area is imaged in individual pixels of the individual cameras, which image the partial areas, as parallel partial straight lines.

5. The camera according to claim 4, wherein the image processing device performs a vertical and/or horizontal displacement of the optical individual images of the individual cameras in relation to each other as correction rule, and to discard a remaining overlapping area in the individual images of the adjacent individual cameras.

6. The camera according to claim 1, wherein the image processing device performs, by pixel address or pixel value manipulations, a vertical and/or horizontal displacement of the individual images, of the optical individual cameras in relation to each other, a rotation and a scaling of the digital individual images as a correction rule, and to discard a remaining overlapping area of the individual images of adjacent optical individual cameras such that, when the corrected individual images are assembled to obtain the corrected overall image, the digital individual images are vertically, horizontally, rotationally and regarding scale adapted to each other.

7. The camera according to claim 1, wherein the image processing device corrects deviating reductions in the optical imaging device of the optical individual cameras.

8. The camera according to claim 1, wherein the image processing device uses a look-up table as the correction rule, wherein an optical individual look-up table is associated to an individual camera.

9. The camera according to claim 1, wherein the optical imaging device of an optical individual camera causes a reduction by a factor of less than 5.

10. The camera according to claim 1,
    wherein a number of pixels of the optical capture is equal to a number of pixels of a partial area, and
    wherein an individual image has a resolution which is substantially equal to the overall resolution multiplied with the number of optical individual cameras.

11. The camera according to claim 10, wherein the resolution of an individual image is higher than 15 times the overall resolution of the optical capture and the number of the optical individual cameras is higher than 15.

12. The camera according to claim 1, wherein the light sensor of an individual camera is a CCD sensor, which is effective to reduce a maximum resolution of the CCD sensor in integer steps to the individual resolution in an analog way in a binning mode.

13. The camera according to claim 1, wherein the screen is a scintillator screen.

14. The camera according to claim 1, wherein a protective pane, which is X-ray absorbing and optically transparent, is arranged between the screen and the optical imaging device.

15. The camera according to claim 14, wherein the protective pane can be heated during or after radiation with X-rays.

16. The camera according to claim 1, wherein the image processing device comprises:
    an individual image memory for every optical individual camera, wherein the image processing device is effective to store a sequence of individual images of the optical individual camera in the image memory for the optical individual camera.

17. The camera according to claim 16, wherein every optical individual camera has an A/D converter on the output side, whose conversion depth is more than 8 bit.

18. The camera according to claim 1, wherein the optical arrangement comprises one or several lenses, mirror optics, fiber optics or a combination of said optical arrangements.

19. The camera according to claim 1, wherein the image processing device is configured to perform the assembling by putting together non-overlapping portions of the corrected individual images.

20. The camera according to claim 1, wherein the image processing device is configured to perform, within the correction
    binning on the digital individual images to reduce the individual resolution to obtain the corrected individual images with an intermediate resolution between the individual resolution and the predetermined overall resolution.

21. The camera according to claim 1, wherein the image processing device is effective to perform the the assembling by aligning the corrected individual images in relation to each other under overlapping area elimination, with the overlapping area elimination comprising discarding whole rows and columns in the corrected individual images.

22. A method for optically capturing a screen, wherein the screen has an area, and wherein a predetermined overall resolution is provided for the optical capture, comprising the steps of:
    capturing the screen via an array of optical individual cameras, wherein every individual camera is fixed on a camera mount of a camera support, wherein an optical individual camera comprises a light sensor and an optical imaging device, wherein the light sensor and the optical imaging device are effective to capture a partial area of the screen area with an individual resolution, which is higher than the predetermined overall resolution, wherein the light sensor and the optical imaging device are arranged such that the partial areas of the optical individual cameras partially overlap each other; and
    processing digital individual images of the array of optical individual cameras to generate the optical capture of the screen with the predetermined overall resolution, wherein the step of processing comprises the following substeps:
        correcting the digital individual images to reduce alignment inaccuracies and parameter variations including scaling variations in the array of optical individual cameras, wherein in the step of correcting a correction rule determined for an individual image during calibration is used, and wherein the correction results in corrected individual images having a correction resolution, which is higher than the predetermined overall resolution and lower than or equal to the individual resolution dual images;
        assembling, with overlapping areas of the corrected individual images eliminated, the corrected individual images to obtain a corrected overall image having the correction resolution; and
        combining adjacent pixels of the corrected overall image to reduce the resolution thereof down to the predetermined overall resolution.

* * * * *